United States Patent [19]

Shibasaki et al.

[11] Patent Number: 5,843,525
[45] Date of Patent: Dec. 1, 1998

[54] SURFACE-MODIFIED METAL OXIDE FINE PARTICLES AND PROCESS FOR PRODUCING THE SAME

[75] Inventors: Takeyoshi Shibasaki; Masamichi Murota, both of Yokkaichi, Japan

[73] Assignee: Nippon Aersoil Co., Ltd., Tokyo, Japan

[21] Appl. No.: 801,873

[22] Filed: Feb. 18, 1997

[51] Int. Cl.$^6$ ............................... B05D 1/36; B05D 3/02; B01J 2/30
[52] U.S. Cl. .................... 427/214; 427/221; 427/379; 427/387; 427/389.7; 427/407.2; 428/405; 428/406; 428/407
[58] Field of Search .................................... 427/387, 214, 427/215, 219, 220, 221, 407.2, 379, 389.7

[56] References Cited

U.S. PATENT DOCUMENTS

| | | | |
|---|---|---|---|
| 4,503,092 | 3/1985 | Hans Klebe et al. | 427/213 |
| 4,568,625 | 2/1986 | Uchiyama et al. | 430/110 |
| 4,618,556 | 10/1986 | Takenouchi | 430/110 |

FOREIGN PATENT DOCUMENTS

| | | |
|---|---|---|
| 649887 | 4/1995 | European Pat. Off. . |
| 57-2641 B | 1/1982 | Japan . |
| 58-185405 | 10/1983 | Japan . |
| 86-50882 B | 11/1986 | Japan . |
| 02-287459 A | 11/1990 | Japan . |

OTHER PUBLICATIONS

Translation of JP 287459, Nov. 1990.

*Primary Examiner*—Erma Cameron
*Attorney, Agent, or Firm*—Joseph C. Mason, Jr.

[57] ABSTRACT

By treating metal oxide fine particles having a specific surface area of 5 to 500 m$^2$/g with a silane coupling agent and then further treating the fine particles with a reactive group-terminated organopolysiloxane, the organopolysiloxane is stably bonded to the surface of the powder particles, to thereby improve stability of the modifying effect against the elapse of time and durability.

3 Claims, No Drawings

SURFACE-MODIFIED METAL OXIDE FINE PARTICLES AND PROCESS FOR PRODUCING THE SAME

FIELD OF THE INVENTION

The present invention relates to surface-modified metal oxide fine particles and a process for producing the same. The surface-modified metal oxide fine particles of the present invention are useful for liquid systems such as liquid resins and liquid rubbers as a thickening agent or a reinforcing filler, and also useful for powder systems such as powder paints and toners for electrophotography in improving flowability of the powder, preventing solidification of the powder and controlling electrification.

BACKGROUND OF THE INVENTION

Metal oxide particles, such as silica, for use as a thickening agent or a reinforcing filler in organic liquids are usually modified on the particle surface with a silane coupling agent to give hydrophobicity to the surface. For example, Japanese Examined Patent Publication No. Sho. 61-50882 (50882/1986) discloses a surface modification by treating a high-temperature synthesized silicon dioxide with an organohalogensilane. In view of reducing residual adsorbents and silanol groups remaining on the surface, an organopolysiloxane is more preferred as a surface-modifying agent than an alkylsilane, as exemplified in Japanese Examined Patent Publication No. Sho. 57-2641 (2641/1982). However, in the case where metal oxide fine particles such as silica are surface-modified directly with a polymeric substance such as silicone oil, the resultant metal oxide fine particles tend to aggregate strongly.

Therefore, surface-modifying processes have been proposed in which metal oxide fine particles are treated with a silane coupling agent prior to the treatment with an organopolysiloxane. For example, Japanese Unexamined Patent Publication No. Hei. 2-287459 (287459/1990) discloses that an organopolysiloxane reacts with the surface of the metal oxide fine particles or is physically adsorbed to the surface by a two-step surface-modifying process using a silane coupling agent such as hexamethyldisilazane, vinyl triethoxysilane and dimethyldichlorosilane, and an organopolysiloxane compound such as dimethylsilicone oil, an alkyl-modified silicone oil and a fluorine-modified silicone oil.

Bonding between conventional organopolysiloxane molecules and the hydrophobic surface of the metal oxide fine particles treated with a silane coupling agent is considered to include not only weaker physical adsorption but also stronger chemical bonding; however, the proportion of chemical bonding to physical adsorption is low. This fact is demonstrated by a hexane extraction test. Specifically, on treating the surface-modified particles with hexane, most of the surface-modifying agents attached to the particle surface by physical adsorption are separated from the surface to migrate into hexane. For example, in the case of surface-treated fine particles obtained by treating metal oxide fine particles directly with an organopolysiloxane, the extractability with hexane is about 20%. On the other hand, in applying a two-step surface-modifying process with a silane coupling agent and an organopolysiloxane, about 50% of the organopolysiloxane present on the particle surface is extracted with hexane.

As described above, the proportion of chemical bonding between organopolysiloxane and metal oxide fine particles treated with a silane coupling agent has still been practically insufficient. As a result, when using such a powder subjected to the conventional two-step modifying process mixed with a liquid resin or a rubber, about half of the polysiloxane surface-modifying agent present on the particle surface is eluted from the surface, resulting in alteration of the resin or rubber, or deterioration with the elapse of time in properties such as plasticity and viscosity. Furthermore, also in using for powder systems such as toners for electrophotography, the weak bonding between organopolysiloxane and the particle surface leads to abrasion of the surface layer to thereby impair durability and flowability.

The present invention improves the stability of the surface-modifying effect against the elapse of time and the durability of metal oxide fine particles treated with an organopolysiloxane as a surface-modifying agent by stably bonding organopolysiloxane molecules onto the surface of the powder particles.

SUMMARY OF THE INVENTION

An object of the present invention is to provide surface-modified metal oxide fine particles in which polysiloxane molecules are chemically bonded strongly to the particle surface by firstly treating the particles with a silane coupling agent to give hydrophobicity to the particles and secondly further treating the particles with an organopolysiloxane having a reactive functional group at each of both the terminals.

Specifically, the present invention provides:

(1) surface-modified metal oxide fine particles obtained by treating metal oxide fine particles having a specific surface area of 5 to 500 m$^2$/g with a silane coupling agent and then treating the metal oxide fine particles with an organopolysiloxane having a reactive group at each of both the terminals.

(2) The above-described organopolysiloxane having a reactive group at each of both the terminals for use as a surface-modifying agent for metal oxide fine particles preferably has a viscosity at 25° C. of 20 to 2,000 cs and is preferably represented by the following formula (I):

(In formula (I), substituents represented by R each is a group selected from methyl group and ethyl group, with the proviso that part of the substituents each may be a vinyl group, or an alkyl group containing a phenyl group or an amino group; X represents a halogen atom, a hydroxy group or an alkoxy group; and p represents a degree of polymerization and is an integer of 15 to 500.)

(3) The above-described silane coupling agent for modifying the surface of metal oxide fine particles is preferably represented by the following formula (II) or (III):

(In the above formula, Y represents a group selected from hydroxy group, an alkoxy group and a halogen atom; R' represents an alkyl group having 1 to 18 carbon atoms; and m represents an integer of 0 to 3.)

(4) The above surface-modified metal oxide fine particles preferably has an extractability with normal hexane of 30% or lower.

Furthermore, the present invention provides:

(5) a process for producing surface-modified metal oxide fine particles, which comprises mixing a silane coupling agent with metal oxide fine particles having a specific surface area of 5 to 500 m²/g in an amount of 1 to 50% by weight based on the metal oxide fine particles, heating the mixture, then adding thereto an organopolysiloxane having a reactive group at each of both the terminals in an amount of 1 to 50% by weight based on the metal oxide fine particles and further heating the mixture.

DETAILED DESCRIPTION OF THE INVENTION

Metal oxide fine particles for use a raw material for producing the surface-modifying particles of the present invention have a specific surface area of 5 to 500 m²/g, preferably 20 to 400 m²/g. If the particles have a specific surface area smaller than 5 m²/g, thickening effect and reinforcing effect are insufficient when adding the particles to a liquid resin. Metal oxide fine particles having a specific surface area exceeding 500 m²/g aggregates so strongly that it makes difficult to disperse the particles in a liquid resin. Preferred examples of the metal oxide include silica, titania and alumina.

As a first step of the process of the present invention, any known conventional method may be used. Specifically, metal oxide fine particles formed by, for example, a vapor-phase high-temperature thermal decomposition method of a metal halide are placed in a mixer. While stirring the particles under a nitrogen atmosphere, a prescribed amount of a silane coupling agent, together with a solvent as needed, are dropwise added thereto or sprayed therein so as to sufficiently disperse the silane coupling agent. Then, the dispersion is heated and stirred at a temperature of 70° C. or higher for 0.1 to 5 hours, preferably 1 to 2 hours while the solvent and byproducts are evaporated to be removed, and cooled.

The silane coupling agent for use in the present invention is not particularly limited. Preferred examples of the silane coupling agent include the alkylsilane compounds represented by the following formula (II) or (III).

(In the above formula, Y represents a group selected from a hydroxy group, alkoxy group and a halogen atom; R' represents an alkyl group having 1 to 18 carbon atoms; and m represents an integer of 0 to 3.)

The addition amount of the silane coupling agent may be an amount generally required in modifying metal fine particles. In general, a silane coupling agent is added in an amount of 1 to 50% by weight based on the metal oxide fine particles to be modified. If the addition amount is smaller than 1% by weight, the effect of the modification is unclear. If the addition amount exceeds 50% by weight, the effect of the modification is saturated.

The second modifying step of the process of the present invention is carried out as follows. The metal oxide fine particles subjected to the first modifying step of treatment with a silane coupling agent are placed in a mixer. Under a nitrogen atmosphere, a prescribed amount of an organopolysiloxane having a reactive functional group at each of both the terminals described below, together with a solvent as needed, are dropwise added thereto or sprayed therein so as to sufficiently disperse the organopolysiloxane. Then, the dispersion is heated and stirred at a temperature of 70° C. or higher for 0.1 to 5 hours, preferably 1 to 2 hours while the solvent is removed. Uniformly surface-modified metal oxide fine particles are obtained by the above-described two-step process of the present invention.

The organopolysiloxane having a reactive group at each of both the terminals for use in the above second treatment is preferably has a viscosity at 25° C. of 20 to 2,000 cs and is preferably represented by the following formula (I):

(In formula (I), substituents represented by R each is a group selected from methyl group and ethyl group, with the proviso that part of the substituents each may be a vinyl group, or an alkyl group containing a phenyl group or an amino group; X represents a halogen atom, a hydroxy group or an alkoxy group; and p represents a degree of polymerization and is an integer of 15 to 500.)

If the degree of polymerization (p) of the above organopolysiloxane is smaller than 15, the organopolysiloxane tends to volatilize easily due to the low molecular weight, so that it makes difficult to highly enhance the hydrophobicity of the fine particles. On the other hand, the degree of polymerization greater than 500 results in significant aggregation of the powder particles during the modifying process, so that the original characteristics of the metal oxide fine particles disappear disadvantageously.

Examples of the organopolysiloxane having a reactive group at each of both the terminals according to the present invention include the followings:

Silanol-modified silicone oil (such as α, 'ω-dihydroxy-dimethylpolysiloxane)

Alkoxy-modified silicone oil (such as α, ω-dialkoxydimethyl-polysiloxane)

Alkoxyvinyl-modified silicone oil

Alkoxyphenyl-modified silicone oil (such as α, ω-dihydroxy-methylphenylpolysiloxane)

Alkoxyamino-modified silicone oil

The surface-modified metal oxide of the present invention is prepared by adding the above-described organopolysiloxane to hydrophobic metal oxide fine particles in an amount of 1 to 50% by weight based on the weight of the hydrophobic metal oxide fine particles to be modified. If the addition amount of the organopolysiloxane is smaller than 1% by weight, the effect of the modification is unclear. If the addition amount exceeds 50% by weight, the effect of the modification is saturated.

EXAMPLES AND COMPARATIVE EXAMPLES

Examples and Comparative Examples according to the present invention are set forth below.

Various characteristics of the samples (surface-modified particles in Examples and Comparative Examples) were evaluated according to the following measurements.

(1) normal hexane Extractability

This characteristic is measured to quantitatively evaluate chemical bonding between an organosilane compound or an organopolysiloxane compound and the particle surface. The measurement was carried out as follows.

To 15 g of a sample in a two-liter four-necked flask, 500 ml of normal hexane was added. After replacing the atmosphere in the system with nitrogen gas, the mixture was stirred and refluxed at 55° C. for 6 hours. After separating the hexane solution and evaporating hexane to be removed from the solution, the weight of the extract obtained was measured. The normal hexane extractability is defined as a value obtained by dividing the weight of the extract by the weight increase of the particles after the second treatment in terms of 15 g of the sample, as represented by the following formula. In the case of calculating the normal hexane extractability of the first treatment, the denominator in the formula is regarded as the difference between the weights of the powder particles before and after the first modifying treatment.

normal hexane extractability (%)=(the weight of the organic components extracted with normal hexane)/(the increase of the weight of the powder particles by the treatment with an organopolysiloxane)×100

(2) Carbon Amount

The amount of carbon contained in surface-modified metal oxide fine particles was determined with a trace carbon microanalyzer (EMIA-110, Horiba, Ltd.) after thermally decomposing carbon atoms contained in the hydrophobic groups present on the surface of the metal oxide fine particles into $CO_2$ at 1,100° C. in an oxygen atmosphere.

(3) Thixotropy Index

The thixotropy index is to evaluate the effect on flowability of the addition of a sample to a liquid system (a liquid resin), and calculated from the viscosity of the sample. The measurement was carried out as follows.

In 100 parts by weight of an epoxy resin (Epikote 807), 5.6 parts by weight of a sample was dispersed using a dissolver at 3,000 rpm for 3 minutes. After keeping the dispersion at 22° C. for 2 hours, the viscosity at 2.5 rpm and 20 rpm of the dispersion were determined with an EDH model viscometer. The thixotropy index of the sample is obtained as a ratio of the viscosity at 2.5 rpm to the viscosity at 20 rpm.

(4) Plasticity

This measurement is to evaluate the effect on plasticity of the addition of a sample to a rubber. Specifically, after kneading 40 parts by weight of sample particles to 100 parts by weight of a silicone raw rubber (Siloprene VS, Bayer AG) for 20 minutes with a two-roll kneader, the plasticity of the sample was measured with a Williams plastometer.

(5) Flowability

This measurement is to evaluate the effect on flowability of the addition of a sample to a powder system, ie. a toner. The measurement was carried out as follows.

A sample was added to a toner having a particle diameter of 7 μm in an amount of 0.3% and mixed. A measuring apparatus was prepared by placing a 48-mesh sieve (perforation size: 300 μm) on a 100-mesh sieve (perforation size: 150 μm). A sample was placed on the upper part of the apparatus, that is, the 48-mesh sieve, and screened using a shaker. The flowability was evaluated as the percentage of the amount of the toner that passed through the 100-mesh sieve to the total amount of the subjected toner.

Example 1

A hundred parts by weight of a fumed silica (Aerosil 130, Nippon Aerosil Co., Ltd.; specific surface area: 130 m²/g) was placed in a mixer. Under a nitrogen atmosphere, one part by weight of water and 15 parts by weight of hexamethyldisilazane were added dropwise while stirring. The mixture was heated and stirred at 200° C. for 1 hour, and cooled after removing ammonia to obtain a powder. The powder had a carbon amount of 1.5% by weight and an normal hexane extractability of 0%. To the powder, 10 parts by weight of α, ω-dihydroxydimethylpolysiloxane (40 cs) whose both terminals were terminated with a hydroxy group as a reactive group, diluted with 30 parts by weight of hexane was further added dropwise. The mixture was then heated and stirred at 300° C. for 2 hours to remove the solvent. The powder obtained had a carbon amount of 4.5% by weight and an normal hexane extractability of 8%. When adding the powder to an epoxy resin, the mixture had a viscosity (at 2.5 rpm, hereinafter the same) of 170 Pa·s and a thixotropy index of 3.8. After 3 months, the mixture had a viscosity (at 2.5 rpm) of 169 Pa·s and a thixotropy index of 3.8. The sample had a Williams plasticity of 210. The plasticity after maintaining the sample at 25 for 3 months was 220. The flowability measured by using a toner having a particle diameter of 7 μm was 75%. Using this mixed toner, a copying test was carried out with a commercial electrophotocopier. As a result, good image characteristics were demonstrated without causing fogged images in spite of copying of more than 20,000 sheets.

Comparative Example 1

The same process as in Example 1 was repeated except for using organopolysiloxane whose both terminals were terminated with a methyl group (KF96-50cs, Shin-Etsu Chemical Co, Ltd.) instead of the α, ω-dihydroxydimethylpolysiloxane.

The resultant fumed silica had a carbon amount of 4.4% by weight and an normal hexane extractability of 50%. When adding the fumed silica to an epoxy resin, the mixture had a viscosity of 110 Pa·s and a thixotropy index of 3.0. After 3 months, the mixture had a viscosity of 100 Pa·s and a thixotropy index of 2.8. The sample had a Williams plasticity of 280. The plasticity after maintaining the sample at 25° C. for 3 months was 390. The flowability measured by using a toner having a particle diameter of 7 μm was 60%. Using this mixed toner, a copying test was carried out with a commercial electrophotocopier. A fogged image was formed upon copying of 10,400 sheets.

Example 2

A hundred parts by weight of a super fine titanium oxide particle (Titanium oxide P25, Nippon Aerosil Co., Ltd.; specific surface area: 50 m²/g) was placed in a mixer. Under a nitrogen atmosphere, one part by weight of water and 10 parts by weight of octyltrimethoxysilane were added dropwise while stirring. The mixture was heated and stirred at 100° C. for 1 hour, and cooled to obtain a powder. The powder had a carbon amount of 3.8% by weight and an normal hexane extractability of 2%. To the powder, 10 parts by weight of α, ω-dihydroxydimethyl-polysiloxane (90 cs) diluted with 30 parts by weight of hexane was further added dropwise. The mixture was then heated and stirred at 150° C. for 2 hours to remove the solvent. The super fine titanium oxide particle obtained had a carbon amount of 6.6% by weight and an normal hexane extractability of 25%. When adding the powder to an epoxy resin, the mixture had a viscosity of 60 Pa·s and a thixotropy index of 1.2. After 3 months, the mixture had a viscosity of 63 Pa·s and a thixotropy index of 1.2. When mixing the fine particles with a toner having a particle diameter of 7 μm in an amount of 0.3%, the mixed toner exhibited a flowability of 71%. Using the mixed toner, a copying test was carried out with a commercial electrophotocopier. As a result, good image characteristics were achieved without causing fogged images in spite of copying of more than 20,000 sheets.

Comparative Example 2

The same process as in Example 2 was repeated except for using organopolysiloxane whose both terminals were terminated with a methyl group (KF96-100cs, Shin-Etsu Chemical Co, Ltd.) instead of the α,ω-dihydroxydimethylpolysiloxane. The resultant super fine titanium oxide particle had a carbon amount of 6.5% by weight and an normal hexane extractability of 70%. When adding the powder to an epoxy resin, the mixture had a viscosity of 55 Pa·s and a thixotropy index of 1.2. After 3 months, the mixture had a viscosity of 50 Pa·s and a thixotropy index of 1.1. When mixing the fine particles with a toner having a particle diameter of 7 μm in an amount of 0.3%, the mixed toner exhibited a flowability of 35%. Using the mixed toner, a copying test was carried out with a commercial electrophotocopier. A fogged image was formed upon copying of 16,000 sheets.

Example 3

A hundred parts by weight of a fumed silica (Aerosil 130, Nippon Aerosil Co., Ltd.; specific surface area: 130 m²/g) was placed in a mixer. Under a nitrogen atmosphere, 5 parts by weight of water and 7 parts by weight of dimethyldichlorosilane were added dropwise while stirring. The mixture was heated and stirred at 400° C. for 1 hour, and cooled to obtain a powder. The powder had a carbon amount of 0.8% by weight and an normal hexane extractability of 0%. To the powder, 10 parts by weight of α,ω-dihydroxydimethylpolysiloxane (1,000 cs) diluted with 50 parts by weight of hexane was further added dropwise. The mixture was then heated and stirred at 300° C. for 2 hours to remove the solvent. The fumed silica obtained had a carbon amount of 3.8% by weight and an normal hexane extractability of 9%. When adding the powder to an epoxy resin, the mixture had a viscosity of 170 Pa·s and a thixotropy index of 3.8. After 3 months, the mixture had a viscosity of 165 Pa·s and a thixotropy index of 3.8. The sample had a Williams plasticity of 190 after adding it into silicone raw rubber and stirred. The plasticity after maintaining the sample at 25° C. for 3 months was 200. When mixing the fine particles with a toner having a particle diameter of 7 μm in an amount of 0.3%, the mixed toner exhibited a flowability of 75%. Using the mixed toner, a copying test was carried out with a commercial electrophotocopier. As a result, good image characteristics were achieved without causing fogged images in spite of copying of more than 20,000 sheets.

Comparative Example 3

The same process as in Example 3 was repeated except for using organopolysiloxane whose both terminals were terminated with a methyl group (KF96-1000cs, Shin-Etsu Chemical Co, Ltd.) instead of the α,ω-dihydroxydimethylpolysiloxane. The resultant fumed silica had a carbon amount of 3.6% by weight and an normal hexane extractability of 65%. When adding the fumed silica to an epoxy resin, the mixture had a viscosity of 105 Pa·s and a thixotropy index of 2.9. After 3 months, the mixture had a viscosity of 110 Pa·s and a thixotropy index of 2.7. The sample had a Williams plasticity of 265 after adding into silicone raw rubber and stirred. The plasticity after maintaining the sample at 25° C. for 3 months was 370. When mixing the fine particles with a toner having a particle diameter of 7 μm in an amount of 0.3%, the mixed toner exhibited a flowability of 51%. Using the mixed toner, a copying test was carried out with a commercial electrophotocopier. As a result, a fogged image was formed upon copying of 15,400 sheets.

Example 4

A hundred parts by weight of a fumed silica (Aerosil 200, Nippon Aerosil Co., Ltd.; specific surface area: 200 m²/g) was placed in a mixer. Under a nitrogen atmosphere, 8 parts by weight of water and 11 parts by weight of dimethyldichlorosilane were added dropwise while stirring. The mixture was heated and stirred at 400° C. for 1 hour, and cooled to obtain a powder. The powder had a carbon amount of 1.2% by weight and an normal hexane extractability of 0%. To the powder, 10 parts by weight of α,ω-dihydroxymethylphenylpolysiloxane (400 cs) diluted with 50 parts by weight of hexane was further added dropwise. The mixture was then heated and stirred at 300° C. for 2 hours to remove the solvent. The fumed silica obtained had a carbon amount of 5.2% by weight and an normal hexane extractability of 8%. When adding the powder to an epoxy resin, the mixture had a viscosity of 176 Pa·s and a thixotropy index of 3.9. After 3 months, the mixture had a viscosity of 169 Pa·s and a thixotropy index of 3.7. The sample had a Williams plasticity of 250 after adding it into silicone raw rubber and stirred. The plasticity after maintaining the sample at 25° C. for 3 months was 265. When mixing the fine particles with a toner having a particle diameter of 7 μm in an amount of 0.3%, the mixed toner exhibited a flowability of 70%. Using the mixed toner, a copying test was carried out with a commercial electrophotocopier. As a result, good image characteristics were achieved without causing fogged images in spite of copying of more than 20,000 sheets.

Comparative Example 4

The same process as in Example 4 was repeated except for using methylphenylpolysiloxane whose both terminals were terminated with a methyl group (KF54-400cs, Shin-Etsu Chemical Co, Ltd.) instead of the α,ω-dihydroxymethylphenylpolysiloxane. The resultant fumed silica had a carbon amount of 4.9% by weight and an normal hexane extractability of 55%. When adding the fumed silica to an epoxy resin, the mixture had a viscosity of 130 Pa·s and a thixotropy index of 2.9. After 3 months, the mixture had a viscosity of 97 Pa·s and a thixotropy index of 2.5. The sample had a Williams plasticity of 295 after adding into silicone raw rubber and stirred. The plasticity after maintaining the sample at 25° C. for 3 months was 360. When mixing the fine particles with a toner having a particle diameter of 7 μm in an amount of 0.3%, the mixed toner exhibited a flowability of 44%. Using the mixed toner, a copying test was carried out with a commercial electrophotocopier. As a result, a fogged image was formed upon copying of 8,000 sheets.

Example 5

A hundred parts by weight of a fumed silica (Aerosil 300, Nippon Aerosil Co., Ltd.; specific surface area: 300 m²/g) was placed in a mixer. Under a nitrogen atmosphere, 12 parts by weight of water and 17 parts by weight of dimethyldichlorosilane were added dropwise while stirring. The mixture was heated and stirred at 400° C. for 1 hour, and cooled to obtain a powder. The powder had a carbon amount of 2.0% by weight and an normal hexane extractability of 0%. To the powder, 10 parts by weight of α,ω-dihydroxymethylvinylpolysiloxane (50 cs) diluted with 20 parts by weight of hexane was further added dropwise.

The mixture was then heated and stirred at 300° C. for 2 hours to remove the solvent. The fumed silica obtained had a carbon amount of 4.8% by weight and an normal hexane extractability of 11%. When adding the powder to an epoxy resin, the mixture had a viscosity of 128 Pa·s and a thixotropy index of 2.2. After 3 months, the mixture had a viscosity of 122 Pa·s and a thixotropy index of 2.2. The sample had a Williams plasticity of 286 after adding into silicone raw rubber and stirred. The plasticity after maintaining the sample at 25° C. for 3 months was 298. When mixing the fine particles with a toner having a particle diameter of 7 μm in an amount of 0.3%, the mixed toner exhibited a flowability of 78%. Using the mixed toner, a copying test was carried out with a commercial electrophotocopier. As a result, good image characteristics were achieved without causing fogged images in spite of copying of more than 20,000 sheets.

Comparative Example 5

The same process as in Example 5 was repeated except for using methylvinylsiloxydimethylpolysiloxane whose both terminals were terminated with a methyl group instead of the α, ω-dihydroxymethylvinylpolysiloxane. The resultant fumed silica had a carbon amount of 4.5% by weight and an normal hexane extractability of 60%. When adding the fumed silica to an epoxy resin, the mixture had a viscosity of 118 Pa·s and a thixotropy index of 2.1. After 3 months, the mixture had a viscosity of 105 Pa·s and a thixotropy index of 1.8. The sample had a Williams plasticity of 328 after adding into silicone raw rubber and stirred. The plasticity after maintaining the sample at 25° C. for 3 months was 338. When mixing the fine particles with a toner having a particle diameter of 7 μm in an amount of 0.3%, the mixed toner exhibited a flowability of 50%. Using the mixed toner., a copying test was carried out with a commercial electrophotocopier. As a result, a fogged image was formed upon copying of 14,000 sheets.

Example 6

A hundred parts by weight of a fumed silica (Aerosil 50, Nippon Aerosil Co., Ltd.; specific surface area: 50 m$^2$/g) was placed in a mixer. Under a nitrogen atmosphere, 2 parts by weight of water and 3 parts by weight of dimethyldichlorosilane were added dropwise while stirring. The mixture was heated and stirred at 400° C. for 1 hour, and cooled to obtain a powder. The powder had a carbon amount of 0.5% by weight and an normal hexane extractability of 0%. To the powder, 5 parts by weight of amino-modified silicone oil whose both terminals were terminated with an ethoxy group diluted with 25 parts by weight of hexane was further added dropwise. The mixture was then heated and stirred at 200° C. for 2 hours to remove the solvent. The fumed silica obtained had a carbon amount of 2.0% by weight and an normal hexane extractability of 10%. When mixing the fine particles with a toner having a particle diameter of 7 μm in an amount of 0.3%, the mixed toner exhibited a flowability of 77%. Using the mixed toner, a copying test was carried out with a commercial electrophotocopier. As a result, good image characteristics were achieved without causing fogged images in spite of copying of more than 20,000 sheets.

Comparative Example 6

The same process as in Example 6 was repeated except for using a silicone oil having an amino group at the side chain whose both end terminals were terminated with a methyl group amino-modified silicone oil whose both terminals were terminated with a methyl group (KF865-90cs, Shin-Etsu Chemical Co, Ltd.) instead of the amino-modified silicone oil whose both end terminals were terminated with an ethoxy group. The resultant fumed silica had a carbon amount of 1.9% by weight and an normal hexane extractability of 62%. When mixing the fine particles with a toner having a particle diameter of 7 μm in an amount of 0.3%, the mixed toner exhibited a flowability of 40%. Using the mixed toner, a copying test was carried out with a commercial electrophotocopier. As a result, a fogged image was formed upon copying of 12,500 sheets.

The results of the above Examples and Comparative Examples are summarized in Table 1. As shown in Table 1, the amounts of the surface modifying agent present on the particle surface in Examples each are almost the same as in the corresponding Comparative Examples, respectively (see the column of "Carbon Amount" in Table 1). However, in the Examples, which employ an organopolysiloxane according to the present invention, the hexane extractabilities each are quite low. The results show that most of the surface modifying agent molecules present on the particle surface are chemically bonded to the surface. On the other hand, all the hexane extractabilities in Comparative Examples, which employ the conventional organopolysiloxanes, are as high as 50% or more. The results show that in these particles, more than half of the organosiloxane molecules are present on the surface by physical adsorption, not by chemical bonding, or even if the organosiloxane molecules are chemically bonded to the surface, the stability of the bonding is low.

As described above, in the powder particles which are surface-modified according to the present invention, the molecules of the organopolysiloxane, which is a modifying agent, are stably bonded to the particle surface. In the case of adding the particles to a resin or a rubber for practical uses, the thickening effect on the resin is remarkable and stable against the elapse of time. In the case of rubber, excellent results are achieved with respect to plasticity, and the effect on plasticity is highly stable against the lapse of time. Furthermore, in the case of mixing the particles with a toner, the values of the flowability achieved in all the Examples are as high as 70% or more, resulting in no fogged images in spite of copying of 20,000 sheets or more.

Since the surface-modified metal oxide fine particles of the present invention are treated on the surface with an organopolysiloxane having a reactive group at each of both the terminals, base particles are chemically bonded strongly to the modifying agent, in contrast with the surface treatment by the conventional organopolysiloxane method. Therefore, mixing the surface-modified particles according to the present invention with a liquid resin, etc., does not cause any troubles such as the adverse effect on the characteristics of the resin, etc. due to elution of the modifying agent from the particles. Furthermore, the modifying effect according to the present invention is highly stable against the elapse of time. The surface-modified particles of the present invention can be used by mixing the particles with various powders such as a toner for electrophotography. The powder mixed with the particles of the present invention is excellent in flowability, chargeability and durability as compared with the conventional products. The stability against the elapse of time is also highly improved.

TABLE 1

|  | Carbon amount (WT %) | Normal hexan extractability (%) | Fluidic characteristics when adding powder to epoxy resin | | | | Plasticity when adding sample to silicone raw rubber | | Flowability of power when adding it | Copy image characteristics (number of fogged paper) |
|---|---|---|---|---|---|---|---|---|---|---|
|  |  |  | at the early stage of mixture | | 3 months after mixture | | | | | |
|  |  |  | Viscosity | TI[1] | Viscosity | TI[1] | early stage | after 3 months | | |
| Example 1 | 4.5 | 8 | 170 | 3.8 | 169 | 3.8 | 210 | 220 | 75% | No fogged paper[2] |
| Comparative Example 1 | 4.4 | 50 | 110 | 3.0 | 100 | 2.8 | 280 | 390 | 60% | 10,400 |
| Example 2 | 6.6 | 25 | 60 | 1.2 | 63 | 1.2 | Not measured | | 71% | No fogged paper |
| Comparative Example 2 | 6.5 | 70 | 55 | 1.2 | 50 | 1.1 | | | 35% | 16,000 |
| Example 3 | 3.8 | 9 | 170 | 3.8 | 165 | 3.8 | 190 | 200 | 75% | No fogged paper |
| Comparative Example 3 | 3.6 | 65 | 105 | 2.9 | 110 | 2.8 | 265 | 370 | 51% | 15,400 |
| Example 4 | 5.2 | 8 | 176 | 3.9 | 169 | 3.7 | 250 | 265 | 70% | No fogged paper |
| Comparative Example 4 | 4.9 | 55 | 130 | 2.9 | 97 | 2.5 | 295 | 360 | 44% | 8,000 |
| Example 5 | 4.8 | 11 | 128 | 2.2 | 122 | 2.2 | 286 | 298 | 78% | No fogged paper |
| Comparative Example 5 | 4.5 | 60 | 118 | 2.1 | 105 | 1.8 | 328 | 338 | 50% | 14,000 |
| Example 6 | 2.0 | 10 | Not measured | | | | Not measured | | 77% | No fogged paper |
| Comparative Example 6 | 1.9 | 62 |  |  |  |  |  |  | 44% | 12,500 |

Note[1]: TI is an abbreviation of thixotropy index.
Note[2]: It means no fogged page appeared after taking copies over 2,000 sheets.

While the invention has been described in detail and with reference to specific examples thereof, it will be apparent to one skilled in the art that various changes and modifications can be made therein without departing from the spirit and scope thereof.

What is claimed is:

1. Surface-modified metal oxide fine particles obtained by treating metal oxide fine particles having a specific surface area of 5 to 500 m²/g with a silane coupling agent and then treating the metal oxide fine particles with an organopolysiloxane having a reactive group at each terminus thereof, wherein the organopolysiloxane having a reactive group at each terminus thereof has a viscosity at 25° C. of 20 to 2,000 cs and is represented by the following formula (I):

wherein each substituent represented by R is, independently, selected from the group consisting of a methyl group and an ethyl group, with the proviso that part of each said substituent may be a vinyl group, a phenyl group, or an alkyl group; each X represents, independently, a halogen atom, a hydroxy group or an alkoxy group; and p represents a degree of polymerization and is an integer of 15 to 500; and wherein the silane coupling agent is represented by the following formula (II) or (III):

$$Y_{4-m}SiR'm \quad \text{(II)}$$

$$R'_3SiNHSiR'_3 \quad \text{(III)}$$

wherein Y is selected from the group consisting of a hydroxy group, an alkoxy group and a halogen atom; each R' represents, independently, an alkyl group having 1 to 18 carbon atoms; and m represents an integer of 0 to 3.

2. The surface-modified metal oxide fine particles as claimed in claim 1, which has a normal hexane extractability of 30% or lower in extracting the metal oxide fine particles treated with an organopolysiloxane having a reactive group at each of both of the terminals, the normal hexane extractability being defined by the following formula:

normal hexane extractability (%)=(the weight of the organic components extracted with normal hexane)/(the increase of the weight of the particles by the treatment with an organopolysiloxane)×100.

3. The surface-modified metal oxide fine particles as in claim 1 or 2, which are obtained by mixing said silane coupling agent with metal oxide fine particles having a specific surface area of 5 to 500 m²/g in an amount of 1 to 50% by weight based on the metal oxide fine particles, to provide a mixture, heating the mixture to provide a heated mixture, adding to the heated mixture said organopolysiloxane having a reactive group at each said terminus thereof in an amount of 1 to 50% by weight based on the metal oxide fine particles and further heating said heated mixture.

* * * * *

UNITED STATES PATENT AND TRADEMARK OFFICE
CERTIFICATE OF CORRECTION

PATENT NO : 5,843,525
DATED : December 1, 1998
INVENTOR(S) : Takeyoshi Shibasaki et al.

It is certified that error appears in the above-identified patent and that said Letters Patent is hereby corrected as shown below:

On title page, item 73 Assignee
replace "Nippon Aersoil Co., Ltd., Tokyo, Japan"
with --Nippon Aerosil Co., Ltd., Tokyo, Japan--.

Signed and Sealed this

First Day of June, 1999

Q. TODD DICKINSON

Attest:

Attesting Officer

Acting Commissioner of Patents and Trademarks